June 30, 1953     S. L. BRADLEY     2,644,127
REGULATING SYSTEM

Filed Dec. 22, 1951     2 Sheets-Sheet 1

WITNESSES:

INVENTOR
Schuyler L. Bradley.
BY
ATTORNEY

Patented June 30, 1953

2,644,127

UNITED STATES PATENT OFFICE 2,644,127

REGULATING SYSTEM

Schuyler L. Bradley, Pittsburgh, Pa., assignor to Westinghouse Electric Corporation, East Pittsburgh, Pa., a corporation of Pennsylvania Application December 22, 1951, Serial No. 262,973

9 Claims. (Cl. 322—25)

This invention relates to regulating systems and, in particular, to a regulating system for maintaining the output voltage of an alternating-current generator substantially constant.

Many types of regulating systems have been provided for maintaining the output voltage of a three-phase alternating generator substantially constant, however, these prior art regulating systems in many cases tend to unbalance the output of the three-phase generator. In addition, those prior art regulating systems which utilize a magnetic amplifier to amplify the output of the generator apply alternating-current energy to the magnetic amplifier from a separate source of low frequency energy or from the low frequency output of the generator. When low frequency energy is applied to a magnetic amplifier, its speed of response is low and the physical size of the magnetic amplifier great. Such being the case, the efficiency of these prior art regulating systems is decreased and their original cost of manufacture greatly increased.

An object of this invention is to deliver controlled three-phase rectified current to the field winding of a three-phase generator to thereby balance its output.

Another object of this invention is to provide a high frequency source of alternating-current energy for a magnetic amplifier so as to provide a rapid responding generator regulating system.

Still another object of this invention is to provide in a generator regulating system a self-starting system for the generator by supplying energy to the generator field by means of a permanent magnet exciter.

Other objects of this invention will become apparent from the following description when taken in conjunction with the accompanying drawings in which.

Figure 1:
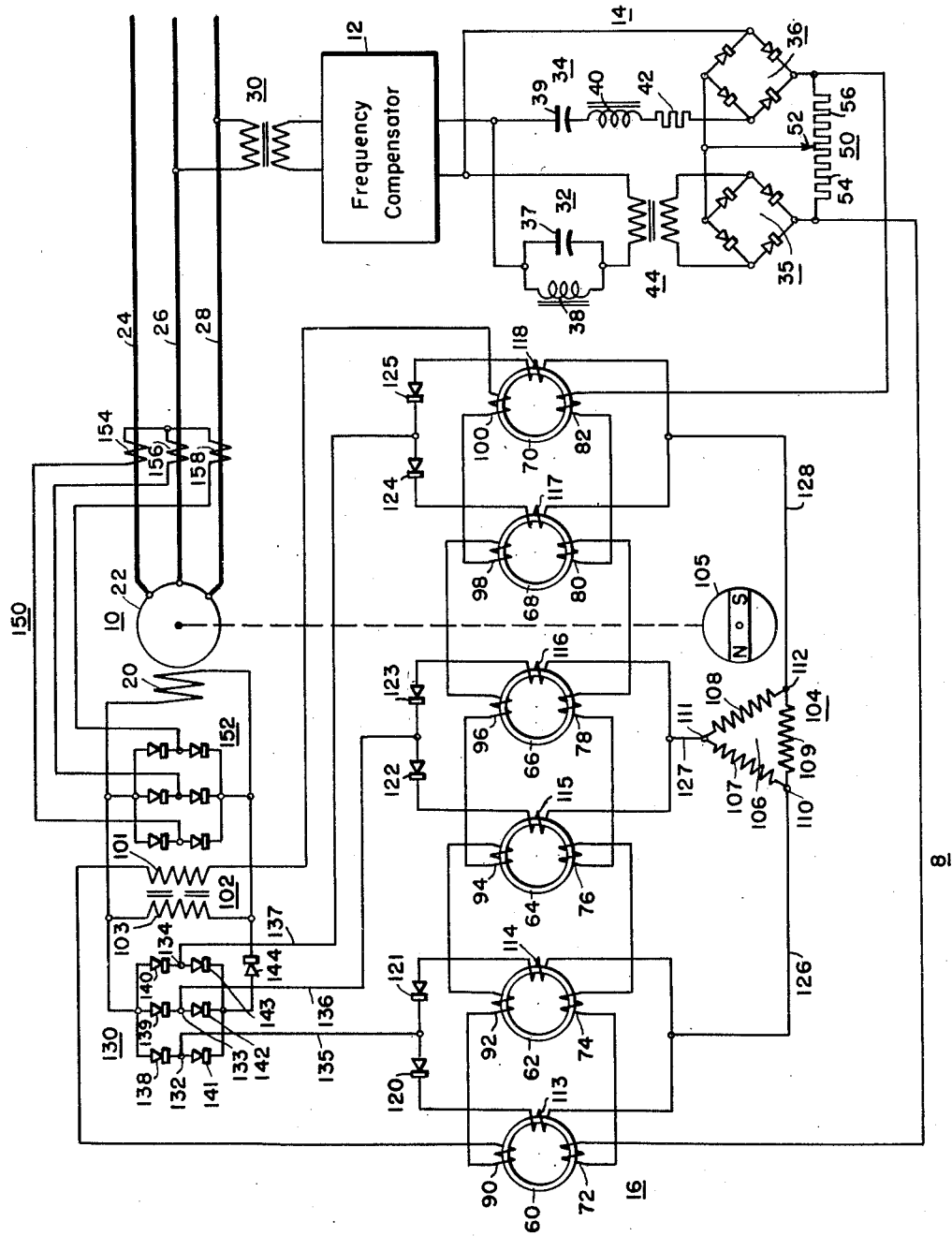
Figure 1 is a schematic diagram of one embodiment of this invention.

Referring to Figure 1 of the drawing, there is illustrated generally at 8 a regulating system for maintaining the output voltage of a three-phase alternating-current generator 10 substantially constant. The regulating system 8 comprises, in general, a suitable frequency compensating network 12, a voltage reference network 14, and a three-phase magnetic amplifier 16 which is responsive to the output of the voltage reference network 14 and so disposed as to control the excitation of the generator 10. In this instance, the generator 10 comprises a field winding 20 and armature windings 22 which are disposed to supply energy to load conductors 24, 26, and 28.

In order to provide a measure of the output voltage of the generator 10 which is substantially independent of the frequency of the output voltage, the frequency compensator 12 is electrically connected to the load conductors 26 and 28 through a potential transformer 30. For the purpose of providing a sensitive measuring circuit for measuring the deviations of the voltage across the conductors 26 and 28 from the regulated value for the generator 10, the voltage reference network 14 is electrically connected to the output of the frequency compensator 12. The voltage reference network 14, in this instance, comprises two non-linear impedance devices 32 and 34 disposed to supply full-wave dry-type rectifiers 35 and 36, respectively. The non-linear impedance device 32 comprises a capacitor 37 and a saturable reactor 38 connected in parallel circuit relation, whereas the non-linear impedance device 34 comprises a capacitor 39, a saturable reactor 40 and a resistor 42 connected in series circuit relation. As illustrated, an isolating transformer 44 is electrically connected between the output of the non-linear impedance device 32 and the input to the rectifier 35 to isolate the components of the non-linear impedance devices 32 and 34 from the direct-current output of the rectifiers 35 and 36.

In order to provide for obtaining variable output from the voltage reference network 14, in accordance with the deviation of the voltage across the conductors 26 and 28 from the predetermined value which is to be maintained substantially constant, the output terminals of the rectifiers 35 and 36 are connected in circuit relation with a resistor 50, different portions or sections of which are disposed to be connected in circuit relation with the respective rectifiers, as by means of a sliding contact member 52. Thus, a portion 54 of the resistor 50, connected between the contact member 52 and one of the output terminals of the rectifier 35, will provide a potential which is a measure of the output voltage of the rectifier 35, and a portion 56 of the resistor 50, connected between the movable contact member 52 and one of the output terminals of the rectifier 36, will provide a potential which is a measure of the output voltage of the rectifier 36. It is to be noted that when the output voltage of the generator 10 is at its regulated value, there will be a net effective zero potential across the resistor 50.

The magnetic amplifier 16 is electrically connected across the output of the voltage reference network 14, in particular across the resistor 50, in order to effectively amplify the output from the voltage reference network 14 and thus obtain sufficient power for controlling the excitation of the generator 10. As illustrated, the magnetic amplifier 16 comprises a plurality of magnetic core members 60, 62, 64, 66, 68, and 70. In order to vary the saturation of the core members 60, 62, 64, 66, 68, and 70, in accordance with the potential across the resistor 50, a plurality of control windings 72, 74, 76, 78, 80, and 82 are disposed in inductive relation around the core members 60, 62, 64, 66, 68, and 70, respectively, the control windings being connected in series circuit relation with one another and across the output of the voltage reference network 14.

In addition to the above-referred to windings, a plurality of damping windings 90, 92, 94, 96, 98, and 100 are likewise disposed in inductive relation around the core members 60, 62, 64, 66, 68, and 70, respectively, in order to produce a flux which opposes the flux produced by the respective control windings and thus prevent hunting in the system. The damping windings 90, 92, 94, 96, 98, and 100 are connected in series circuit relation with one another and across the secondary winding 101 of a damping transformer 102 whose primary winding 103 is electrically connected across the field winding 20 of the generator 10.

In order to supply high frequency alternating-current energy for the magnetic amplifier 16, a permanent magnet pilot exciter 104 is provided. As illustrated, the permanent magnet pilot exciter comprises a rotor 105 and a three-phase stator 106 having three windings 107, 108 and 109, the junction point of the windings 107 and 109 being connected to a terminal 110, the junction point of the windings 107 and 108 being connected to a terminal 111, and the junction point of the windings 108 and 109 being connected to a terminal 112.

As illustrated, alternating-current or reactor windings 113, 114, 115, 116, 117 and 118 are disposed in inductive relation around the magnetic core members 60, 62, 64, 66, 68 and 70, respectively. In this instance, the alternating-current windings 113 and 114 are connected in parallel circuit relation, the alternating-current winding 113 being connected in series circuit relation with a rectifier 120 and the alternating-current winding 114 being connected in series circuit relation with a rectifier 121 which is of opposite polarity from the rectifier 120. The alternating-current windings 115 and 116 are likewise connected in parallel circuit relation, the alternating-current winding 115 being connected in series circuit relation with a rectifier 122 and the alternating-current winding 116 being connected in series circuit relation with a rectifier 123, which is of opposite polarity from the rectifier 122. As illustrated, the alternating-current windings 117 and 118 are also connected in parallel circuit relation, the alternating-current winding 117 being connected in series circuit relation with a rectifier 124 and the alternating-current winding 118 being connected in series circuit relation with a rectifier 125 which is of opposite polarity from the rectifier 124.

Although the windings 113 through 118 have been referred to as alternating-current windings, it is, of course, to be understood from the above that actually pulsating direct current flows through these alternating-current windings rather than alternating-current energy, since the rectifiers 120 through 125, respectively, are connected in series circuit relation therewith.

In order to supply energy to the alternating-current windings 113 through 118, the terminals 110, 111 and 112 are connected to the junction point of the alternating-current windings 113 and 114, the junction point of the alternating-current windings 115 and 116, and the junction point of the alternating-current windings 117 and 118, respectively, by means of conductors 126, 127 and 128, respectively.

In order to supply energy from the output of the magnetic amplifier 16 to a three-phase dry-type rectifier 130 having input terminals 132, 133 and 134, a conductor 135 is connected to the junction point of the rectifiers 120 and 121 of the magnetic amplifier 16 and to the terminal 132 of the rectifier 130. In like manner, a conductor 136 is electrically connected to the junction point of the rectifiers 122 and 123 of the magnetic amplifier 16 and to the terminal 133 of the rectifier 130. Another conductor 137 is electrically connected to the junction point of the rectifiers 124 and 125 and to the terminal 134 of the rectifier 130. In this instance, the three-phase rectifier 130 comprises a plurality of rectifiers 138, 139, 140, 141, 142, and 143. As illustrated, a rectifier 144 is connected in circuit relation with the rectifiers 141, 142, and 143, and with one side of the field winding 20 of the generator 10 in order to decrease the magnitude of the voltage that appears across the three-phase rectifier 130 and thus permit the use of a smaller rectifier 130.

For the purpose of more clearly understanding the sequence of flow of current through the alternating-current windings 113 through 118 let us assume that energy is being furnished by the phase as represented by the winding 107 of the pilot exciter 104. When this condition exists, current will flow from the terminal 110 of the stator winding 106 through the conductor 126, the alternating-current winding 114 of the magnetic amplifier 16, the rectifier 121, the conductor 135, the terminal 132 of the three-phase rectifier 130, the rectifier 141, the rectifier 144, the field winding 20 of the generator 10, the rectifier 139 of the three-phase rectifier 130, the conductor 136, the rectifier 122 of the magnetic amplifier 16, the alternating-current winding 115, the conductor 127, the terminal 111 of the pilot exciter 104, and the winding 107 back to the terminal 110. Moving to the next phase, current will flow from the terminal 111 of the pilot exciter 104 through the conductor 127, the alternating-current winding 116 of the magnetic amplifier 16, the rectifier 123, the conductor 136, the terminal 133 of the three-phase rectifier 130, the rectifiers 142 and 144, the field winding 20 of the generator 10, the rectifier 140 of the three-phase rectifier 130, the terminal 134, the conductor 137, the rectifier 124 of the magnetic amplifier 16, the alternating-current winding 117, the conductor 128, the terminal 112 of the pilot exciter 104, and the winding 108 back to the terminal 111. Finally in the third phase, current will flow from the terminal 112 through the conductor 128, the alternating-current winding 118 of the magnetic amplifier 16, the rectifier 125, the conductor 137, the terminal 134 of the three-phase rectifier 130, the rectifiers 143 and 144, the field winding 20 of the generator 10, the rectifier 138 of the three-phase rectifier 130, the terminal 132, the conductor 135, the rectifier 120 of the magnetic amplifier 16, the alternating-current winding 113, the conductor 126, the terminal 110 of the pilot exciter 104, and the winding 109 back to the terminal 112.

It is to be understood that a magnetic amplifier (not shown) whose output supplies direct current could be used in place of the magnetic amplifier 16. If such a magnetic amplifier were used, its output would be connected across the field winding 20 of the generator 10 and the rectifier 130 would be omitted. However, with such apparatus, the advantages that can be obtained by using the rectifier 130 would no longer apply.

In order to obtain the main excitation for the generator 10 when it is under load, and to secure high speed regulation for the generator 10 when the power factor is not very low and leading, an excitation system 150 is provided. As illustrated, the excitation system 150 comprises a three-phase dry-type rectifier 152, the output terminals of which are electrically connected across the field winding 20 of the generator 10, and three current transformers 154, 156 and 158, which are electrically connected to the input terminals of the three-phase rectifier 152 and are electrically associated with the conductors 24, 26 and 28, respectively, so as to be responsive to the flow of load current therethrough.

In operation, assuming the output voltage of the generator 10 increases to a value greater than its regulated value, the voltage across the resistor 50 of the voltage reference network 14 will be such that current will flow from the rectifier 36 through the control windings 82, 80, 78, 76, 74 and 72, respectively. Since the control windings 72, 74, 76, 78, 80, and 82 of the magnetic amplifier 16 are electrically connected across the resistor 50, current will flow through these control windings in a direction to decrease the saturation of the core members 60, 62, 64, 66, 68, and 70, respectively. The decreased saturation of the core members 60, 62, 64, 66, 68, and 70 will increase the impedance of the alternating-current windings 113 through 118, thus decreasing the current flow therethrough and the current flow to the input terminals 132, 133, 134 of the three-phase rectifier 130. Since the field winding 20 of the generator 10 is electrically connected to the output terminals of the rectifier 130, the voltage across the field winding 20 will be decreased proportionately, thus returning the output voltage of the generator 10 to its regulated value.

However, assuming the output voltage of the generator 10 decreases to a value less than its regulated value, current will flow from the rectifier 36 through the control windings 72, 74, 76, 78, 80, and 82, respectively, and in such a direction through the control windings 72, 74, 76, 78, 80, and 82 as to increase the saturation of the core members 60, 62, 64, 66, 68, and 70, respectively. An increased saturation of the core members 60, 62, 64, 66, 68, and 70 decreases the impedance of the alternating-current windings 113, 114, 115, 116, 117, and 118, respectively, thus increasing the input to the three-phase rectifier 130. Since the output terminals of the rectifier 130 are electrically connected across the field winding 20 of the generator 10, the voltage across the field winding 20 will be proportionately increased, thus returning the output voltage of the generator 10 to its regulated value.

The above discussion of operation was with reference to the regulating system 8. However, assuming there is an extremely rapid increase or decrease in the output voltage of the generator 10, the fast responding excitation system 150 will increase or decrease the voltage across the field winding 20 of the generator 10 to return its output voltage to the regulated value, provided the power factor is not very low and leading at the time.

Figure 2:
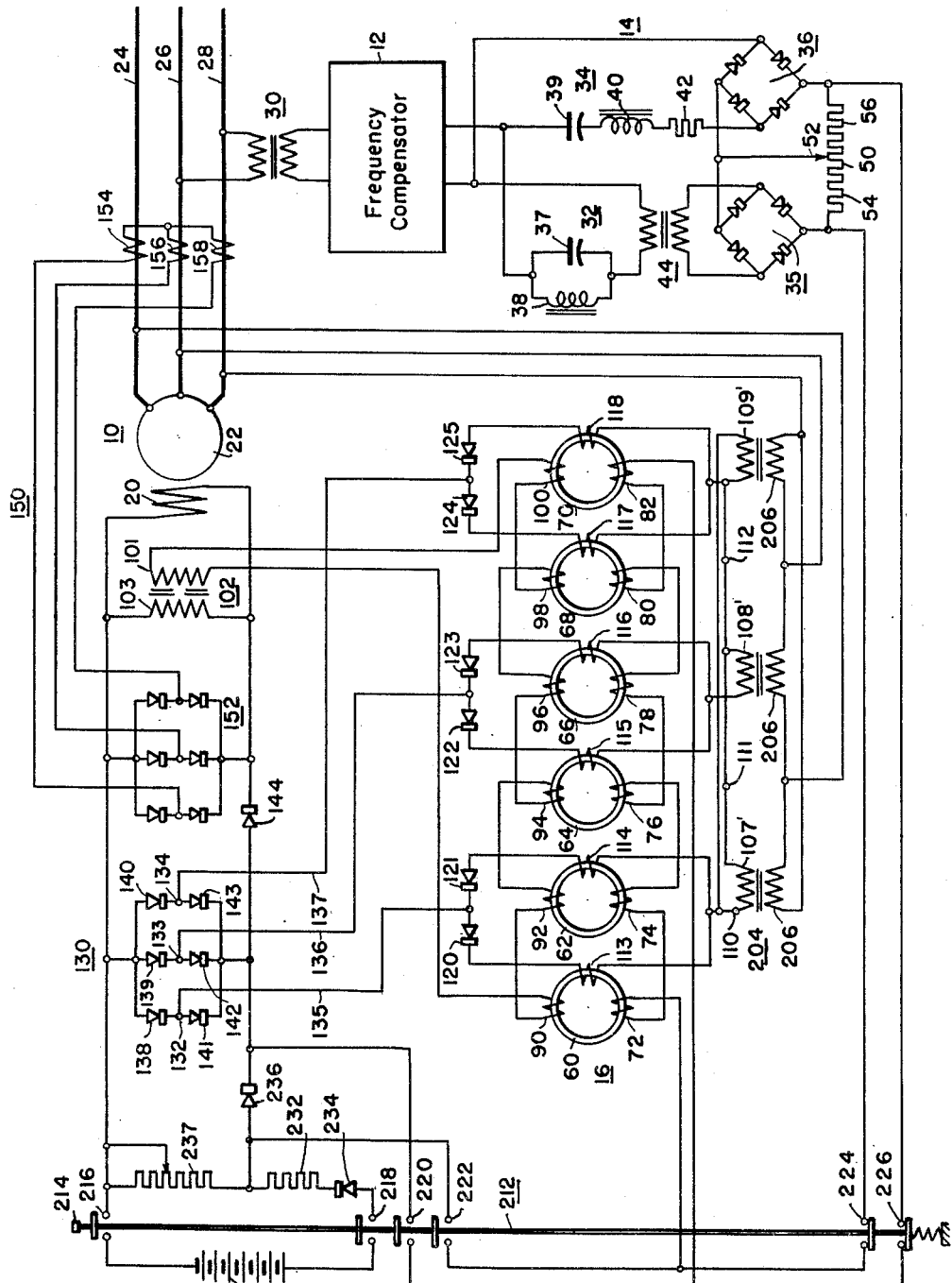
Fig. 2 is a schematic diagram of another embodiment of this invention.

Referring to Fig. 2 of the drawing, there is illustrated another embodiment of the teaching of this invention in which the same reference characters have been given the like components of Figs. 1 and 2. The primary difference between the apparatus shown in Fig. 2 and the apparatus shown in Figure 1 is that in the embodiment of Fig. 2 the magnetic amplifier 16 receives its alternating-current energy from the output of the generator 10 instead of from a permanent magnet pilot exciter 104 as illustrated in Figure 1. In particular, a three-phase transformer 204 is disposed so that its primary windings 206 are electrically connected to the load conductors 24, 26, and 28. The secondary windings 107', 108', and 109' of the transformer 204 are connected in delta and correspond to the stator windings 107, 108, and 109 of the permanent magnet pilot exciter 104 of Figure 1.

Since the residual voltage of the generator 10 is not of sufficient magnitude to build up the alternating-current voltage on starting, a source of direct current, such as a battery 210, is disposed to be connected in circuit relation with the field winding 20 of the generator 10. In particular, the field winding 20 is connected in circuit relation with the battery 210 by means of a switching mechanism 212 which is disposed to selectively connect either the control winding 72, 74, 76, 78, 80, and 82 in circuit relation with the output of the voltage reference network 14, or connect the battery 210 both in circuit relation with the field winding 20 and in circuit relation with the control windings 72, 74, 76, 78, 80, and 82. When the switching mechanism 212, which comprises a pushbutton 214 and contact members 216, 218, 220, 222, 224, and 226 is in the latter position, the magnetic amplifier 16 is capable of supplying current to the field winding 20 to aid in the building up of the generator 10. The circuit for energizing the control windings 72, 74, 76, 78, 80, and 82 from the battery 210 and for energizing the field winding 20 directly from the battery 210, when the pushbutton 214 is in the downward position, extends from the positive side of the battery 210 through the contact member 218 of the switching mechanism 212, a one-way rectifier 234 which prevents the flow of current through the battery 210 in the reverse direction, a resistor 232, the contact member 222 of the switching mechanism 212, the control windings 72, 74, 76, 78, 80, and 82, the contact member 220 of the relay 212, the rectifier 144, the field winding 20 of the generator 10, and the contact member 216 of the switching mechanism 212, to the negative side of the battery 210.

In order to provide a voltage of opposite polarity and of equal magnitude to the battery voltage, once contact members 216, 218, 220, and 222 have been in the circuit closing position for a predetermined length of time a resistor 237 is connected in series circuit relation with the resistor 232 and the rectifier 234, this series circuit being electrically connected across the battery 210 when the contact members 216 and 218 of the switching mechanism 212 are in the circuit closing position. As illustrated, the resistance member 237 is also electrically connected across the output terminals of the three-phase rectifier 130 through the rectifier 236 which is provided in order to prevent the flow of current from the rectifier 130 through the resistance member 237.

When starting up the apparatus of Fig. 2, the pushbutton 214 is actuated into the downward position so that the contact members 216, 218, 220, and 222 of the switching mechanism 212 are in the circuit closing position. When the contact members 216, 218, 220, and 222 are so positioned, an energizing circuit is established for the control windings 72, 74, 76, 78, 80, and 82, as explained hereinbefore. Once this energizing circuit is established, current flows through the control windings 72, 74, 76, 78, 80, and 82 increasing the saturation of the core members 60, 62, 64, 66, 68, and 70, respectively, to thereby decrease the impedance of the alternating-current windings 113 through 118, and thus increase the current flow therethrough. The increased current flow through the alternating-current windings 113 through 118 increases the input current to the rectifier 130 to thereby increase the current flow to the field winding 20 of the generator 10 and thus increase the magnitude of the voltage thereacross. However, once the voltage across the resistance member 237 reaches a predetermined value that is equal and opposite to the voltage produced by the battery 210, there is no current flow to the field winding 20 from the battery 210. Since the voltage of the generator 10 has been built up by the time this predetermined voltage across the resistance member 237 has been reached, the pushbutton 214 should be permitted to return to the position shown in the drawing in which the contact members 224 and 226 are in the circuit closing position. When the contact members 224 and 226 are in the circuit closing position, an energizing circuit is established so as to electrically connect the control windings 72, 74, 76, 78, 80, and 82 across the resistor 50 of the voltage reference network 14, the energizing circuit extending from one end of the resistor 50 through the contact member 224 of the switching mechanism 212, the control windings 72, 74, 76, 78, 80 and 82, and the contact member 226 of the switching mechanism 212 to the other end of the resistor 50. The regulating system, as shown in Fig. 2, then functions in the same manner as does the regulating system 8, as shown in Figure 1.

The apparatus illustrated in Figs. 1 and 2 embodying the teachings of this invention has many advantages. For instance, in the apparatus of Figure 1, the alternating-current voltage of the generator 10 builds up on starting without the use of a battery. In addition, the permanent magnet pilot exciter 104 operates at a relatively high frequency and thus the size and time delay of the magnetic amplifier 16 is greatly reduced as compared to the case when low frequencies are utilized. Further, the three-phase dry-type rectifier 130 tends to balance the output of the generator 10.

Referring to Fig. 2, it is also to be noted that the battery 210 and control windings 72, 74, 76, 78, 80 and 82 of the magnetic amplifier 16 are disposed to be connected in circuit relation so that the magnetic amplifier 16 aids in bringing the alternating-current voltage of the generator 10 up to a predetermined value on starting.

I claim as my invention:

1. In a regulating system for maintaining the output voltage of an alternating-current generator, having a field winding, substantially constant, the combination comprising, a permanent magnet exciter, a voltage reference network responsive to the output of the alternating-current generator, a rectifier having input and output terminals, the output terminals being electrically connected to the field winding of the generator, and a magnetic amplifier comprising a plurality of alternating-current windings which receive alternating-current energy from the output of the permanent magnet exciter and pass alternating current to the input terminals of the rectifier, and at least one control winding connected in circuit relation with the output of the voltage reference network.

2. In a regulating system for maintaining the output voltage of an alternating-current generator having a field winding substantially constant, the combination comprising, a permanent magnet exciter, a voltage reference network responsive to the output of the alternating-current generator and a magnetic amplifier having a direct-current output and comprising a plurality of alternating-current windings which receive alternating-current energy from the output of the permanent magnet exciter and pass direct current to the field winding of the generator, and at least one control winding connected in circuit relation with the output of the voltage reference network.

3. In a regulating system for maintaining the output voltage of an alternating-current generator, having a field winding, substantially constant, the combination comprising, a permanent magnet exciter, a voltage reference network responsive to the output of the alternating-current generator, a three-phase dry-type rectifier having input and output terminals, the output terminals being electrically connected to the field winding of the generator, and a magnetic amplifier comprising a plurality of alternating-current windings which receive alternating-current energy from the output of the permanent magnet exciter and pass alternating current to the input terminals of the rectifier, and at least one control winding connected in circuit relation with the output of the voltage reference network.

4. In a regulating system for maintaining the output voltage of an alternating-current generator, having a field winding, substantially constant, the combination comprising, a permanent magnet exciter, a voltage reference network responsive to the output of the alternating-current generator, a three-phase dry-type rectifier having input and output terminals, the output terminals being electrically connected to the field winding of the generator, and a three-phase magnetic amplifier comprising a plurality of alternating-current windings which receive alternating-current energy from the output of the permanent magnet exciter and pass alternating-current energy to the input terminals of the three-phase dry-type rectifier, and a plurality of control windings disposed to be connected in circuit relation with the output of the voltage reference network.

5. In a regulating system for maintaining the output voltage of a three-phase alternating-current generator, having a field winding, substantially constant, the combination comprising, a permanent magnet exciter, a voltage reference network responsive to the output of the alternating-current generator, a rectifier having input and output terminals, the output terminals being electrically connected to the field winding of the generator, a magnetic amplifier comprising a plurality of alternating-current windings which receive alternating-current energy from the output of the permanent magnet exciter and pass alternating-current to the input terminals of the rectifier, and at least one control winding connected in circuit relation with the output of the voltage reference network, and a main excitation system comprising a three-phase dry-type rectifier connected across the field winding of the generator and three current transformers electrically connected to the input of said three-phase dry-type rectifier and so associated with the output of the generator as to produce a voltage across the field winding of the generator that is dependent upon the current output of the generator.

6. In a regulating system for maintaining the output voltage of an alternating-current generator substantially constant, the generator having a field winding and being disposed to supply three load conductors, the combination comprising, a permanent magnet exciter, a voltage reference network responsive to the output of the alternating-current generator, a three-phase dry-type rectifier having input and output terminals, the output terminals being electrically connected across the field winding of the generator, a three-phase magnetic amplifier comprising a plurality of alternating-current windings which receive alternating-current energy from the output of the permanent magnet exciter and pass alternating current to the input terminals of the three-phase dry-type rectifier, and a plurality of control windings connected in circuit relation with the output of the voltage reference network, and a main excitation system for the three-phase generator which comprises another three-phase dry-type rectifier having input and output terminals, the output terminals being connected across the field winding of the generator, and three current transformers electrically connected to the input terminals of said another three-phase dry-type rectifier and so associated with said three load conductors as to be responsive to the current flow therethrough.

7. In a regulating system for maintaining the output voltage of a three-phase alternating-current generator substantially constant, the alternating-current generator having a field winding and being disposed to supply three load conductors, the combination comprising, a voltage reference network responsive to the output of the alternating-current generator, a three-phase dry-type rectifier having input and output terminals, the output terminals being electrically connected to the field winding of the generator, a magnetic amplifier comprising a plurality of alternating-current windings which receive alternating-current energy from the output of the generator and pass alternating-current energy to the input terminals of the three-phase dry-type rectifier, and a plurality of control windings connected in circuit relation with the output of the voltage reference network, and a main excitation system for the three-phase generator which comprises another three-phase dry-type rectifier having input and output terminals, the output terminals being electrically connected across the field winding of the three-phase generator, and three current transformers electrically connected to the input terminals of said another three-phase dry-type rectifier and so associated with said three load conductors as to produce across the field winding of the generator a voltage dependent upon the current flow through the load conductors.

8. In a regulating system for maintaining the output voltage of an alternating-current generator, having a field winding, substantially constant, the combination comprising, a voltage reference net work responsive to the output of the alternating-current generator, a three-phase dry-type rectifier having input and output terminals, the output terminals being electrically connected to the field winding of the generator, a three-phase magnetic amplifier comprising a plurality of alternating-current windings which receive alternating-current energy from the output of the alternating-current generator and pass alternating current to the input terminals of the three-phase dry-type rectifier, and a plurality of control windings disposed to be connected in circuit relation with the output of the voltage reference network, a direct-current battery, and switching means disposed to selectively either connect the control windings of the three-phase magnetic amplifier in circuit relation with the output of the voltage reference network or to connect the battery in circuit relation with both the field winding of the generator and in circuit relation with both the field winding of the generator and in circuit relation with the control windings of the three-phase magnetic amplifier so as to bring the output voltage of the alternating-current generator on starting up to a predetermined value.

9. In a regulating system for maintaining the output voltage of a three-phase alternating-current generator substantially constant, the alternating-current generator having a field winding and being disposed to supply three load conductors, the combination comprising, a voltage reference network responsive to the output of the alternating-current generator, a three-phase dry-type rectifier having input and output terminals, the output terminals being electrically connected to the field winding of the generator, a magnetic amplifier comprising a plurality of of alternating-current windings which receive alternating-current energy from the output of the generator and pass alternating-current energy to the input terminals of the three-phase dry-type rectifier, and a plurality of control windings disposed to be connected in circuit relation with the output of the voltage reference network, and a main excitation system for the three-phase generator which comprises another three-phase dry-type rectifier having input and output terminals, the output terminals being electrically connected across the field winding of the three-phase generator, three current transformers electrically connected to the input terminals of said another three-phase dry-type rectifier and so associated with said three load conductors as to produce across the field winding of the generator a voltage which is dependent upon the current flow through said load conductors, a direct current battery, and switching means disposed to selectively connect either the control windings of the three-phase magnetic amplifier in circuit relation with the output of the voltage reference network or to connect the battery in circuit relation with both the field winding of the generator and in circuit relation with the control windings of the three-phase magnetic amplifier so as to bring the output voltage of the alternating-current generator on starting up to a predetermined value.

SCHUYLER L. BRADLEY.

References Cited in the file of this patent

UNITED STATES PATENTS

| Number | Name | Date |
| --- | --- | --- |
| 2,571,827 | Bradley | Oct. 16, 1951 |